US012640808B2

(12) United States Patent
Higuchi et al.

(10) Patent No.: US 12,640,808 B2
(45) Date of Patent: May 26, 2026

(54) SATELLITE PLATFORM

(71) Applicant: NEC Corporation, Tokyo (JP)

(72) Inventors: Junichi Higuchi, Tokyo (JP); Hiroaki Miyoshi, Tokyo (JP); Toshiharu Ito, Tokyo (JP); Youichi Hidaka, Tokyo (JP); Takahiro Koishi, Tokyo (JP); Takashi Oonuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 18/533,257

(22) Filed: Dec. 8, 2023

(65) Prior Publication Data

US 2024/0195488 A1     Jun. 13, 2024

(30) Foreign Application Priority Data

Dec. 12, 2022     (JP) ................................. 2022-197828

(51) Int. Cl.
H04B 7/185 (2006.01)
(52) U.S. Cl.
CPC ..... *H04B 7/18515* (2013.01); *H04B 7/18513* (2013.01)
(58) Field of Classification Search
CPC ........................ H04B 7/18513; H04B 7/18515
See application file for complete search history.

(56) References Cited

U.S. PATENT DOCUMENTS

2011/0153906 A1* 6/2011 Suzuki ................ G06F 13/4022
                                                                  710/316
2023/0421253 A1* 12/2023 Palermo ............. H04B 7/18591

FOREIGN PATENT DOCUMENTS

JP          4670676 82          4/2011
WO      2019/017982 A1      1/2019

OTHER PUBLICATIONS

Google NPL patent search (Year: 2026).*

* cited by examiner

*Primary Examiner* — Elton Williams
(74) *Attorney, Agent, or Firm* — Sughrue Mion, PLLC

(57) ABSTRACT

A first satellite includes a first host-side bridge and a first host, connected with a network via the first host-side bridge, mounted thereon. A second satellite includes a first I/O-side bridge and a first I/O device, connected with the network via the first I/O-side bridge, mounted thereon. A management device selects the first host mounted on at least one of the first satellites and the first I/O device mounted on at least one of the second satellites, according to a configuration request, and forms an information processing device in which the first host-side bridge connected with the selected first host and the first I/O-side bridge connected with the selected first I/O device constitute a virtual computer internal bus.

7 Claims, 15 Drawing Sheets

<u>5</u>

51  COMMUNICATION I/F UNIT

52  OPERATION INPUT UNIT

53  SCREEN DISPLAY UNIT

54  ETHERNET COMMUNICATION DEVICE

56  ARITHMETIC PROCESSING UNIT

561  DEVICE CONFIGURATION MANAGEMENT UNIT

562  FAILURE MANAGEMENT UNIT

563  DISPLAY CONTROL UNIT

55  SATELLITE DATABASE

552  SATELLITE DATABASE

553  SOFTWARE DATABASE

554  INFORMATION PROCESSING DEVICE DATABASE

551  PROGRAM

SATELLITE PLATFORM

INCORPORATION BY REFERENCE

The present invention is based upon and claims the benefit of priority from Japanese patent application No. 2022-197828, filed on Dec. 12, 2022, the disclosure of which is incorporated herein in its entirety by reference.

TECHNICAL FIELD

The present disclosure relates to an information processing device formed by connecting hosts and I/O devices, arranged in a distributed manner in a plurality of satellites, with each other, and a satellite platform for forming such an information processing device.

BACKGROUND ART

An artificial satellite (hereinafter simply referred to as satellite) is developed on the orbit of a planet such as the earth to provide various space-based operation. On a satellite, equipment required for the basic functions as a satellite (bus equipment) and equipment required for conducting a mission (mission equipment) are mounted. In order to conduct a mission by one satellite, it is necessary to mount every equipment required for conducting the mission including a host on one satellite. This causes problems of an increase in size of a satellite, and an increase in manufacturing cost, power consumption, and required heat discharge performance, and the like. In order to solve the problems such as an increase in size of a satellite, a satellite cluster has been proposed (for example, refer to Patent Literature 1). The satellite cluster is configured to arrange the equipment necessary for conducting a mission in a distributed manner on a plurality of small satellites such as CubeSats, and allow the satellites to cooperatively conduct the mission.

Meanwhile, Patent Literature 2 discloses ExpEther that is a technology to connect a plurality of hosts and input/output (I/O) devices via Peripheral Component Interconnect-Express (PCIe (Registered Trademark)) switches over the Ethernet.

Patent Literature 1: WO 2019/017982 A
Patent Literature 2: JP 4670676 B

SUMMARY

However, in a satellite cluster, a mission is conducted through cooperation between a plurality of devices that are arranged in a distributed manner by performing computer communication between the satellites. Therefore, on each satellite constituting the satellite cluster, even in the case where the role of the satellite is limited to I/O such as a data storage role, an imaging role, or communication from the satellite to the ground, a host must be mounted thereon as similar to a satellite for conducting a mission by the own. That is, including a host in the mission equipment mounted on a satellite is a common knowledge in the field of conducting a mission by the satellite. Therefore, since a host must be included in the mission equipment, there are various problems that size reduction and cost reduction of a satellite on which mission equipment is mounted are difficult, and the like.

An example of an object of the present disclosure is to provide a satellite platform that solves the problems described above.

A satellite platform, according to one aspect of the present disclosure, is configured to include one or more first satellites on each of which a first host-side bridge and a first host are mounted, the first host being connected with a network via the first host-side bridge, one or more second satellites on each of which a first I/O-side bridge and a first I/O device are mounted, the first I/O device being connected with the network via the first I/O-side bridge, and a management device configured to select the first host mounted on at least one of the first satellites and the first I/O device mounted on at least one of the second satellites, according to a configuration request, and form an information processing device in which the first host-side bridge connected with the selected first host and the first I/O-side bridge connected with the selected first I/O device constitute a virtual computer internal bus.

A method of forming an information processing device, according to another aspect of the present disclosure, is a method to be executed by a computer connected with, over a network, one or more first satellites on each of which a first host-side bridge and a first host are mounted and one or more second satellites on each of which a first I/O-side bridge and a first I/O device are mounted, the first host being connected with the network via the first host-side bridge, the first I/O device being connected with the network via the first I/O-side bridge. The method is configured to include selecting the first host mounted on at least one of the first satellites and the first I/O device mounted on at least one of the second satellites, according to a configuration request by the information processing device, and forming the information processing device in which the first host-side bridge connected with the selected first host and the first I/O-side bridge connected with the selected first I/O device constitute a virtual computer internal bus.

A program, according to another aspect of the present disclosure, is configured to cause a computer to execute processing described below. The computer is connected with, over a network, one or more first satellites on each of which a first host-side bridge and a first host are mounted and one or more second satellites on each of which a first I/O-side bridge and a first I/O device are mounted, the first host being connected with the network via the first host-side bridge, the first I/O device being connected with the network via the first I/O-side bridge. The computer executes processing to select the first host mounted on at least one of the first satellites and the first I/O device mounted on at least one of the second satellites, according to a configuration request by the information processing device, and form the information processing device in which the first host-side bridge connected with the selected first host and the first I/O-side bridge connected with the selected first I/O device constitute a virtual computer internal bus.

An information processing device, according to another aspect of the present disclosure, is configured to include a first host of a first satellite on which a first host-side bridge and the first host are mounted, the first host being connected with a network via the first host-side bridge; and an I/O device of a second satellite on which a first I/O-side bridge and the first I/O device are mounted, the first I/O device being connected with the network via the first I/O-side bridge.

The information processing device is configured such that the first host-side bridge and the first I/O-side bridge constitute a virtual computer internal bus.

A satellite according to another aspect of the present disclosure, is configured to include a host-side bridge;

a host connected with a network via the host-side bridge;

an I/O side bridge; and an I/O device connected with the network via the I/O-side bridge.

Since the present disclosure has the configurations described above, an I/O mounted artificial satellite does not necessarily need to mount a host as mission equipment.

BRIEF DESCRIPTION OF DRAWINGS

FIG. 10 is a block diagram illustrating an example of a configuration of a satellite cluster by an existing technology;

DESCRIPTION OF EMBODIMENTS

Next, example embodiments of the present disclosure will be described in detail with reference to the drawings. In the below description, in the case where a plurality of identical or similar elements exist, a common reference sign may be used for description without distinguishing the respective elements, and branch numbers may be added to the common reference sign to describe the elements in a distinguishable manner.

First Example Embodiment

Figure 1:
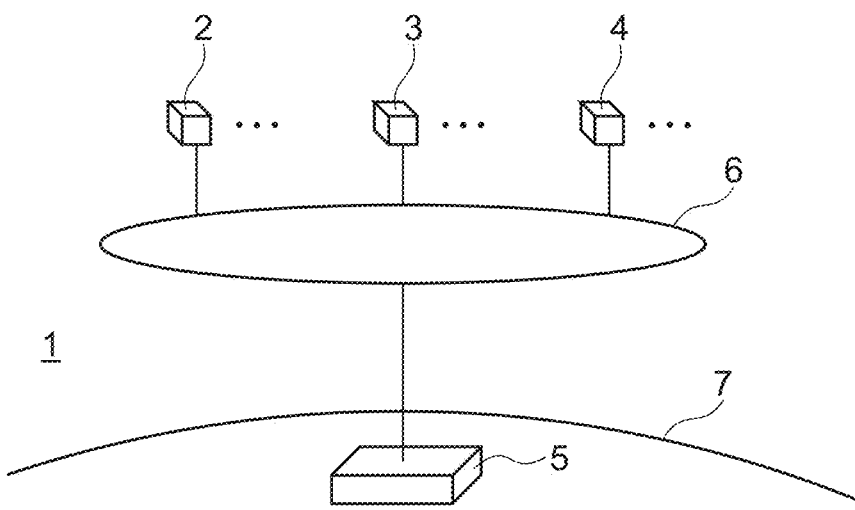
FIG. 1 is a block diagram illustrating the overall configuration of a satellite platform according to a first example embodiment of the present disclosure.

FIG. 1 is a block diagram illustrating the overall configuration of a satellite platform 1 according to a first example embodiment of the present disclosure. Referring to FIG. 1, the satellite platform 1 is configured of a plurality of satellites 2 to 4, a management device 5, and a network 6 using the Ethernet (Ethernet network). The satellites 2 to 4 and the management device 5 are connected with each other over the network 6.

The network 6 may be, for example, an inter-satellite communication Ethernet network for a low earth orbit satellite using a small-sized relay satellite having a free space optical communication function. In that case, by mounting free space optical communication devices on the satellites 2 to 4 and the management device 5, it is possible to remotely connect to the relay satellite of the network 6. However, the network 6 is not limited to the Ethernet network by means of free space optical communication, and may be an Ethernet network by means of radio frequency (RF).

The satellites 2 to 4 are developed on the orbit of the earth 7, for example. The satellites 2 to 4 are low earth orbit satellites, for example. However, the satellites 2 to 4 are not limited to low earth orbit satellites, and may be medium earth orbit satellites or high earth orbit satellites. Low earth orbit satellites, medium earth orbit satellites, and high earth orbit satellites mat be mixed. On each of the satellites 2 to 4, every equipment (bus equipment) required for the basic function as a satellite is mounted. Bus equipment includes various sensors (attitude, orbit, and temperature, voltage, current and the like of respective units), solar cell panels, an attitude control actuator, an orbit control thruster, a heat control device, a wireless communication set with the ground, and the like.

On each of the satellites 2 to 4, equipment to be used for executing a mission (mission equipment) is also mounted. Mission equipment includes a host and an I/O device. On at least one satellite 2 among the satellites 2 to 4, a host is mounted but an I/O device is not mounted as mission equipment. Such a satellite 2 may be referred to as a host-mounted satellite or a first satellite in the below description. Further, on at least one satellite 3, an I/O device is mounted but a host is not mounted as mission equipment. Such a satellite 3 may be referred to as an I/O-mounted satellite or a second satellite in the below description. Further, on at least one satellite 4, a host and an I/O device are mounted as mission equipment. Such a satellite 4 may be referred to as a host and I/O-mounted satellite or a third satellite in the below description.

Before describing an example of a configuration of mission equipment mounted on the satellites 2 to 4, ExpEther will be described.

ExpEther is a technology for PCI Express bus extension bridge, to create Ethernet frames by encapsulating a transaction layer packet (TLP) of PCIe and transmit and receive the created Ethernet frames via the Ethernet. The present embodiment uses the technology of ExpEther to connect the hosts and the I/O devices arranged in a satellite and a plurality of satellites in a distributed manner via the Ethernet. ExpEther includes two types of equipment, that is, ExpEther equipment disposed on the host side (hereinafter also referred to as host-side ExpEther equipment) and ExpEther equipment disposed on the I/O device side (hereinafter also referred to as I/O-side ExpEther equipment). The ExpEther equipment sets, in a frame to be transmitted, a group ID assigned to oneself. When the ExpEther equipment receives a frame in which a group ID that is different from the group ID assigned thereto is set, the ExpEther equipment discards the received frame. Therefore, by setting the same group ID to the host-side ExpEther equipment arranged on the host side and the I/O-side ExpEther equipment arranged on the I/O device side, the host and the I/O device can be connected with each other by a virtual computer internal bus. At that time, the host-side ExpEther equipment operates as an upstream port of the PCIe switch, and the I/O-side ExpEther equipment operates as a downstream port of the PCIe switch.

Figure 2:
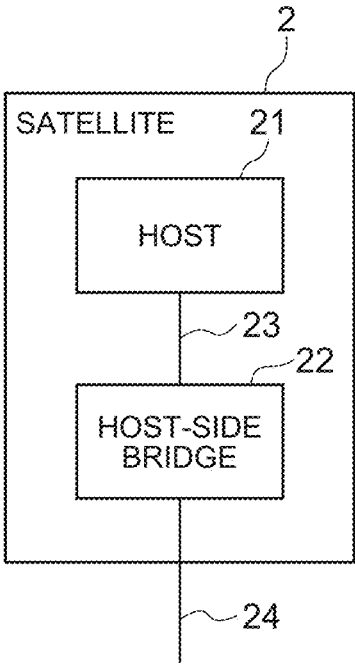
FIG. 2 is a block diagram illustrating an example of a configuration of mission equipment mounted on a host-mounted satellite according to the first example embodiment of the present disclosure.

FIG. 2 is a block diagram illustrating an example of a configuration of mission equipment mounted on the host-mounted satellite 2. Referring to FIG. 2, on the satellite 2, a host 21 and a host-side bridge 22 are mounted. The host 21 and the host-side bridge 22 are connected with each other via a PCIe bus 23. Moreover, the host-side bridge 22 and the network 6 are connected with each other via an Ethernet link 24. An Ethernet switch, not illustrated, may be provided between the host-side bridge 22 and the network 6.

The host 21 includes, for example, a central processing unit (CPI), a memory, and a chip set, not illustrated. Various processes necessary for the mission are performed by the host 21 through execution of a program stored in the memory by the CPU. The host-side bridge 22 bridges the PCIe bus 23 and the Ethernet link 24. The host-side bridge 22 can use host-side ExpEther equipment implemented as a field-programmable gate array (FPGA) or an application specific integrated circuit (ASIC), for example. Alternatively, the host-side bridge 22 can use software ExpEther that is implemented by execution of a program stored in the memory of the host 21 by the CPU. In the present embodiment, on an Ethernet physical layer in the host-side bridge (host-side ExpEther equipment) 22, a transmitter receiver for free space optical communication to transmit and receive Ethernet frames with the network 6 via the Ethernet link 24 is provided.

The host-mounted satellite 2 illustrated in FIG. 2 includes only one set of the host 21 and the host-side bridge 22. However, it may include two or more sets of hosts and host-side bridges. In that case, a plurality of host-side bridges 22 and the network 6 may be connected with each other via individual Ethernet links 24 respectively, or via an Ethernet switch provided between them. Moreover, the host 21 and the host-side bridge 22 may be configured to be cooled by an immersion cooler.

Since the host-mounted satellite 2 illustrated in FIG. 2 has the host 21, it can take on a data processing role.

Figure 3:
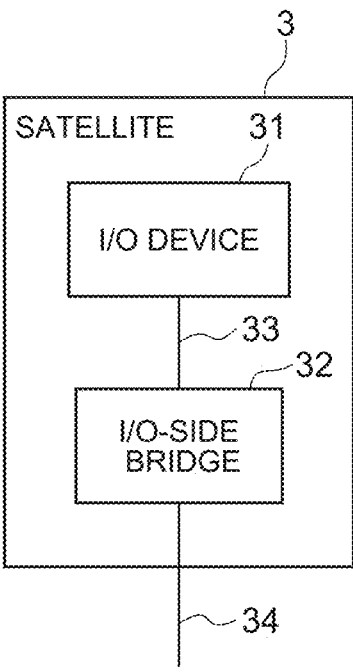
FIG. 3 is a block diagram illustrating an example of a configuration of mission equipment mounted on an I/O-mounted satellite according to the first example embodiment of the present disclosure.

FIG. 3 is a block diagram illustrating an example of a configuration of mission equipment mounted on the I/O- mounted satellite 3. Referring to FIG. 3, on the satellite 3, an I/O device 31 and an I/O-side bridge 32 are mounted. The I/O device 31 and the I/O-side bridge 32 are connected with each other via a PCIe bus 33. Moreover, the I/O-side bridge 32 and the network 6 are connected with each other via an Ethernet link 34. An Ethernet switch, not illustrated, may be provided between the I/O-side bridge 32 and the network 6.

The I/O device 31 is, for example, a sensor device including various types of sensor devices, a network device including various types of communication devices, a storage device including various types of storage devices, or the like. The I/O side bridge 32 bridges the PCIe bus 33 and the Ethernet link 34. The I/O-side bridge 32 can use, for example, I/O-side ExpEther equipment implemented as an FPGA or an ASIC. In the present embodiment, on an Ethernet physical layer in the I/O-side bridge (I/O-side ExpEther equipment) 22, a transmitter receiver for free space optical communication to transmit and receive Ethernet frames with the network 6 via the Ethernet link 34 is provided.

The I/O mounted satellite 3 illustrated in FIG. 3 only includes one set of the I/O device 31 and the I/O-side bridge 32. However, it may include two or more sets of I/O devices and I/O-side bridges. In that case, a plurality of I/O-side bridges 32 and the network 6 may be connected with each other via individual Ethernet links 34 respectively, or via an Ethernet switch provided between them. Moreover, the I/O device 31 and the I/O-side bridge 32 may be configured to be cooled by an immersion cooler.

Since the I/O-mounted satellite 3 illustrated in FIG. 3 includes the I/O device 31, it can take on I/O roles such as data storage role, imaging role, communication role from the satellite to the ground, and the like, depending on the type of the I/O device 31.

Figure 4:
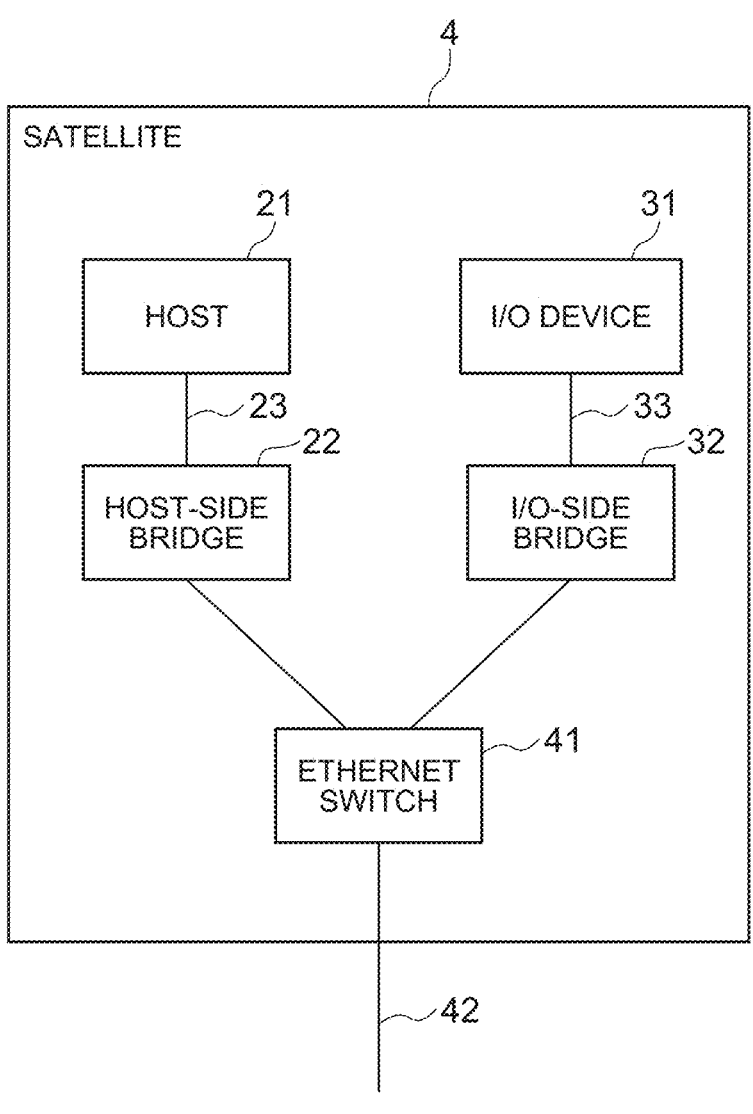
FIG. 4 is a block diagram illustrating an example of a configuration of mission equipment mounted on a host and I/O-mounted satellite according to the first example embodiment of the present disclosure.

FIG. 4 is a block diagram illustrating an example of a configuration of mission equipment mounted on the host and I/O-mounted satellite 4. Referring to FIG. 4, on the satellite 4, the host 21, the host-side bridge 22, the PCIe bus 23, and the Ethernet link 24 that are similar to those in FIG. 2, the I/O device 31, the I/O-side bridge 32, the PCIe bus 33, the Ethernet link 34 that are similar to those in FIG. 3, and an Ethernet switch 41 are mounted. The Ethernet switch 41 is connected with the Ethernet link 24, the Ethernet link 34, and the Ethernet link 42. The Ethernet link 42 is connected with the network 6. Accordingly, the host-side bridge 22 is connected with the Ethernet link 42 and the I/O-side bridge 32 via the Ethernet switch 41. Further, the I/O-side bridge 32 is connected with the Ethernet link 42 and the host-side bridge 22 via the Ethernet switch 41.

The host and I/O-mounted satellite 4 illustrated in FIG. 4 includes one set of the host 21 and the host-side bridge 22, one set of the I/O device 31 and the I/O-side bridge 32, and one Ethernet switch 41. However, it may include two or more sets of hosts and host-side bridges, two or more sets of I/O devices and I/O-side bridges, and two or more Ethernet switches. Moreover, the host 21, the host-side bridge 22, the I/O device 31, and the I/O-side bridge 32 may be configured to be cooled by an immersion cooler.

Since the host and I/O-mounted satellite 4 illustrated in FIG. 4 has the host 21, it can take on a data processing role. Moreover, since the host and I/O-mounted satellite 4 includes the I/O device 31, it can take on I/O roles such as a data storage role, an imaging role, a communication role from the satellite to the ground, and the like depending on the type of the I/O device 31. Even if the host 21 or/and the host-side bridge 22 fail, when the I/O device 31 and the I/O-side bridge 32 are in a normal state, the host and I/O-mounted satellite 4 functions as an I/O-mounted satellite without any problem. Further, even if the I/O device 31 or/and the I/O-side bridge 32 fail, when the host 21 and the host-side bridge 22 are in a normal state, the host and I/O-mounted satellite 4 functions as a host-mounted satellite without any problem.

Next, the management device 5 will be described. The management device 5 manages the overall configuration of the satellite platform 1. In the present example, while the management device 5 is installed on the ground, it may be mounted on a satellite.

Figure 5:
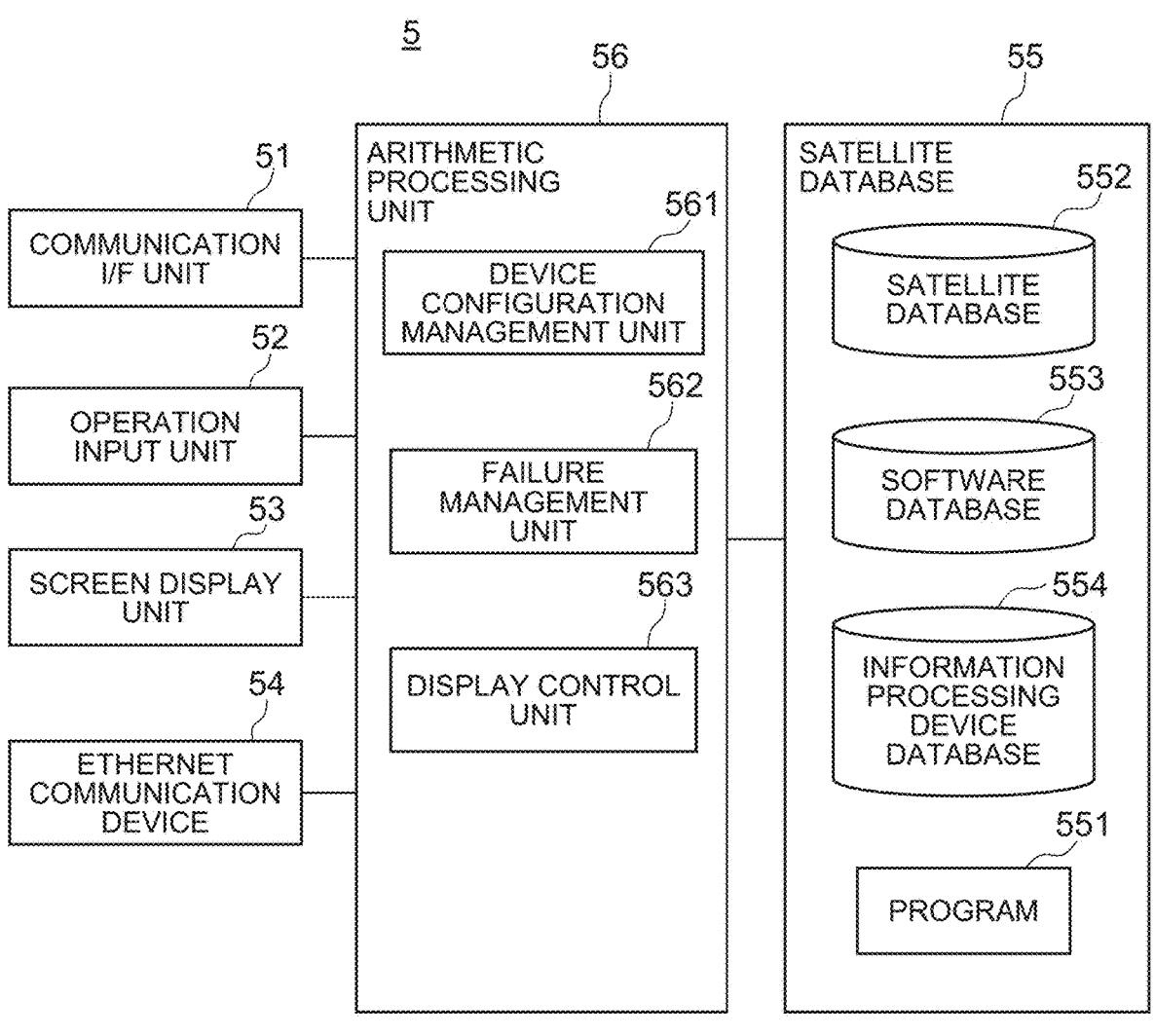
FIG. 5 is a block diagram illustrating an example of a configuration of a management device according to the first example embodiment of the present disclosure.

FIG. 5 is a block diagram illustrating an example of a configuration of the management device 5. Referring to FIG. 5, the management device 5 includes, for example, a communication I/F unit 51, an operation input unit 52, a screen display unit 53, an Ethernet communication device 54, a storage unit 55, and an arithmetic processing unit 56.

The communication I/F unit 51 is configured of a dedicated data communication circuit, and has a function of transmitting and receiving data with an external device, not illustrated, in a wired or wireless manner. The operation input unit 52 is configured of operation input devices such as a keyboard and a mouse, and has a function of detecting an operation by an operator and outputting it to the arithmetic processing unit 56. The screen display unit 53 is configured of a screen display device such as a liquid crystal display (LCD) or a plasma display panel (PDP), and has a function of displaying, on a screen, various types of information such as configuration information of an information processing device formed, according to an instruction from the arithmetic processing unit 56. The Ethernet communication device 54 has a function of transmitting and receiving Ethernet frames between the satellites 2 to 4 over the network 6. In the case of the present embodiment, the Ethernet communication device 54 has a transmitter receiver for free space optical communication to transmit and receive Ethernet frames with the network 6.

The storage unit 55 is configured of storage devices such as a hard disk and a memory, and has a function of storing therein processing information and a program 551 necessary for various types of processing performed in the arithmetic processing unit 56. The program 551 is a program for implementing various processing units by being read and executed by the arithmetic processing unit 56, and is read in advance from an external device (not illustrated) or a storage medium (not illustrated) via a data input-output function of the communication I/F unit 51 and the like, and is stored in the storage unit 55. The main processing information stored in the storage unit 55 includes a satellite database 552, a software database 553, and an information processing device database 554.

Figure 6:
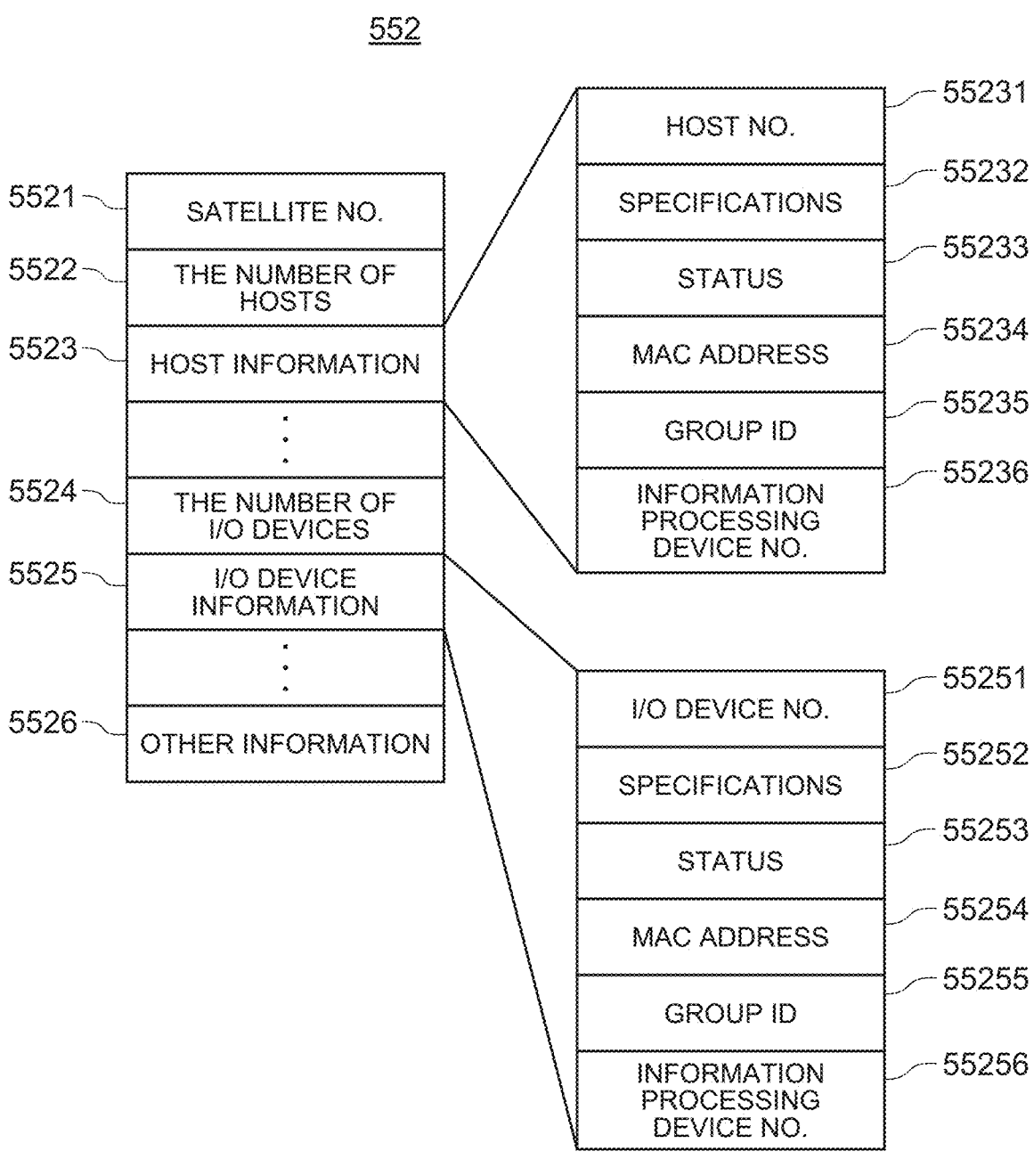
FIG. 6 illustrates an example of information stored in a satellite database according to the first example embodiment of the present disclosure.

The satellite database 552 stores therein various types of information related to the satellites 2 to 4 included in the satellite platform 1. FIG. 6 illustrates an example of information stored in the satellite database 552. In this example, the satellite database 552 includes, for each of the satellites 2 to 4, entries for satellite number 5521, the number of hosts 5522, host information 5523, the number of I/O devices 5524, I/O device information 5525, and other information 5526. In the entry for the satellite number 5521, a satellite number uniquely identifies the satellite is set. In the entry for the number of hosts 5522, the total number of hosts included in the satellite is set. The host information 5523 is present for each host included in the satellite. When there is no host in the satellite, the entry for the host information 5523 is omitted. In the entry for the number of I/O devices 5524, the total number of I/O devices included in the satellite is set.

The I/O device information 5525 is present for each I/O device included in the satellite. When there is no I/O device in the satellite, the entry for the I/O device information 5525 is omitted.

The entry for the host information 5523 is configured of entries for host number 55231, specifications 55232, status 55233, MAC address 55234, group ID 55235, and information processing device number 55236. In the entry for the host number 55231, a host number uniquely identifies the host in the satellite is set. In the entry for the specifications 55232, information such as performance of the CPU included in the host, memory capacity, types and versions of the installed software (OS and the like) is set. In the entry for the status 55233, whether the host is in a normal state or in a failed state is set. In the entry for the MAC address 55234, a MAC address set to the host-side bridge connected to the host or the like is set. In the entry for the group ID 55235, a group ID set to the host-side bridge connected to the host is set. In the entry for the information processing device number 55236, an information processing device number uniquely identifying the information processing device that includes the host as a constituent element. When the host is not a constituent element of any information processing device (that is, when the host is released), NULL is set in the entry for the information processing device number 55236, for example.

The entry for the I/O device information 5525 is configured of entries for I/O device number 55251, specifications 55252, status 55253, MAC address 55254, group ID 55255, and information processing device number 55256. In the entry for the I/O device number 55251, an I/O device number uniquely identifying the I/O device in the satellite is set. In the entry for the specifications 55252, the types of the I/O devices (storage, sensor type, camera, communication device, and the like) included in the I/O device, their performances (storage capacity, sensor performance, camera resolution, communication speed of the communication device, and the like) are set. In the entry for the status 55253, whether the I/O device is in a normal state or in a failed state is set. In the entry for the MAC address 55254, a MAC address set to the I/O-side bridge connected to the I/O device or the like is set. In the entry for the group ID 55255, a group ID set to the I/O-side bridge connected to the I/O device is set. In the entry for the information processing device number 55256, an information processing device number uniquely identifying the information processing device that includes the I/O device as a constituent element is set. When the I/O device is not a constituent element of any information processing device (that is, when the I/O device is released), NULL is set in the entry for the information processing device number 55256, for example.

In the entry for the other information 5526, for example, connection information indicating how the host 21, the host-side bridge 22, the I/O device 31, the I/O-side bridge 32, and the Ethernet switch 41 mounted on the satellite are connected, is saved. Moreover, orbit information (height, speed, moving route, and the like) of the satellite is saved.

The software database 553 stores therein an operating system (OS) and various application programs to be installed in the host 21 of the satellite.

Figure 7:
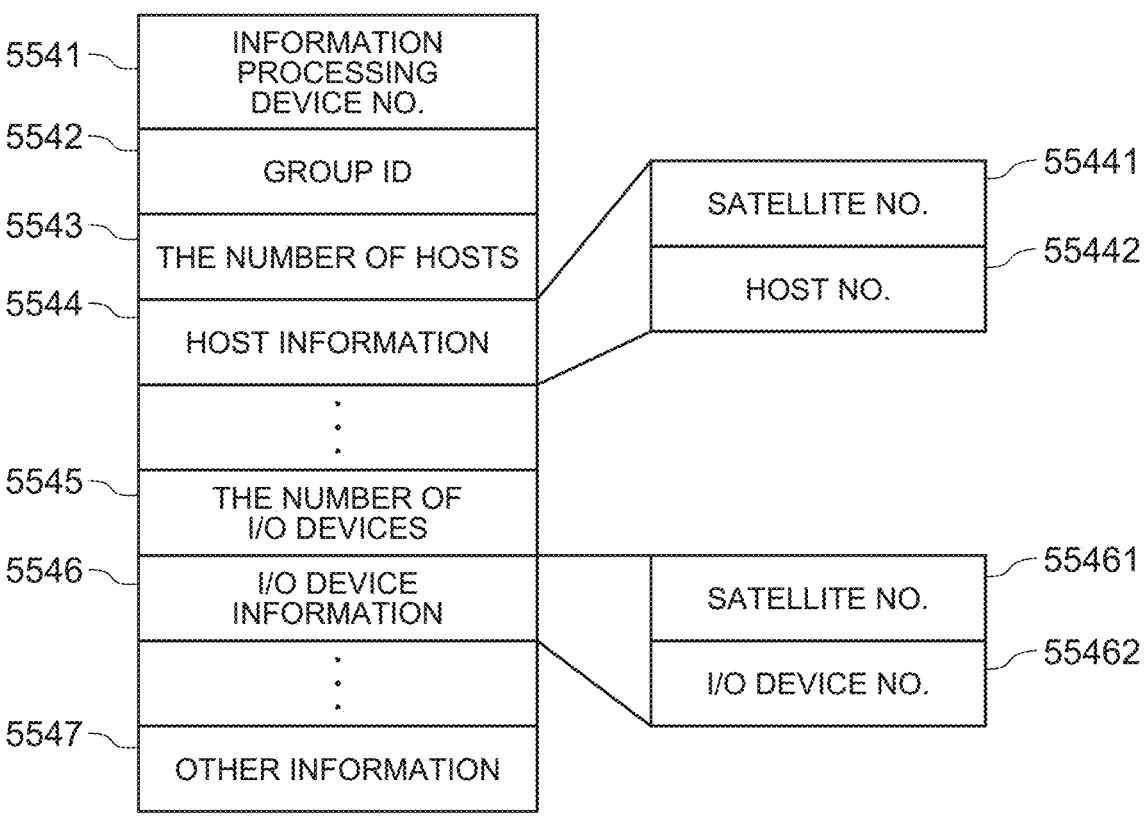
FIG. 7 illustrates an example of information stored in an information processing device database according to the first example embodiment of the present disclosure.

The information processing device database 554 stores therein various types of information related to the information processing device formed by the satellite platform 1. FIG. 7 illustrates an example of information stored in the information processing device database 554. In this example, the information processing device database 554 includes, for each information processing device, entries for information processing device number 5541, group ID 5542, the number of hosts 5543, host information 5544, the number of I/O devices 5545, I/O device information 5546, and other information 5547. In the entry for the information processing device number 5541, an information processing device number uniquely identifying the information processing device is set. In the entry for group ID 5542, a group ID assigned to the information processing device is set. In the entry for the number of hosts 5543, the total number of hosts included in the information processing device is set. The host information 5544 is present for each host included in the information processing device. In the entry for the number of I/O devices 5545, the total number of I/O devices included in the information processing device is set. The I/O device information 5546 is present for each I/O device included in the information processing device.

The entry for the host information 5544 is configured of entries for satellite number 55441 and host number 55442. In the entry for the satellite number 55441, a satellite number uniquely identifies the satellite is set. In the entry for the host number 55442, a host number uniquely identifies the host in the satellite is set.

The entry for the I/O device information 5546 is configured of entries for satellite number 55461 and I/O device number 55462. In the entry for the satellite number 55461, a satellite number uniquely identifies the satellite is set. In the entry for the I/O device number 55462, an I/O device number uniquely identifying the I/O device in the satellite is set.

In the entry for the other information 5547, for example, connection information indicating how the host 21, the host-side bridge 22, the I/O device 31, the I/O-side bridge 32, and the Ethernet switch 41 that are constituent elements of the information processing device are connected, is saved.

Referring to FIG. 5 again, the arithmetic processing unit 56 has a microprocessor such as a CPU and its peripheral circuits, and has a function of reading and executing the program 551 from the storage unit 55 to allow the hardware and the program 551 to cooperate with each other to thereby implement the various processing units. The main processing units implemented by the arithmetic processing unit 56 include a device configuration management unit 561, a failure management unit 562, and a display control unit 563.

The device configuration management unit 561 has a function of constructing an information processing device by combining the hosts 21 and the I/O devices 31 arranged in a distributed manner in the satellites 2 to 4, according to a device configuration request input from the operation input unit 52 or the like. The types of device configuration request include, for example, a device new configuration request, a device extension request, a device degeneration request, a device deletion request, a device function change request, and the like. The device new configuration request is a request for configuring a new information processing device from the hosts 21 and the I/O devices 31 arranged in a distributed manner in the satellites 2 to 4. The device extension request is a request for extending the information processing device by adding the hosts 21 and/or the I/O devices 31 when the performance and the functions of the information processing device is not enough. The device degeneration request is a request for degenerating the information processing device by removing the hosts 21 and/or the I/O devices 31 when the performance and the functions of the information processing device is not needed any more. The device deletion request is a request for deleting the information processing device to release the hosts 21 and the I/O devices 31 that are constituent elements. The device function change request is a request for changing the program, installed in the host 21 of the information processing device, to change the function of the information processing device.

The device new configuration request includes, for example, conditions related to the host 21 and the I/O device 31 to be incorporated in the information processing device desired to be configured. The conditions related to the host 21 include, for example, the number of hosts 21, CPU speed, memory quantity, the types of programs such as OS to be installed, and the like. The conditions related to the I/O device 31 include, for example, the number and types of I/O devices 31 (storage, sensor, network, and the like), required performance specifications, and the like.

The device extension request includes the information processing device number to be extended, and the conditions related to the host 21 and the I/O device 31 to be added. The device degeneration request includes the information processing device number to be degenerated, and the host 21 number and the I/O device 31 number that are not needed any more. The device deletion request includes the information processing device number to be deleted. The device function change request includes the information processing device number whose program is desired to be changed and the host 21 number, and the type of a program to be newly installed.

Besides those described above, various types of device configuration requests such as a request for exchanging the host 21 to another host 21 having different performance, a request for exchanging the I/O device 31 to another I/O device 31 having a different performance, and the like. However, since it can be realized by combining the above-described five types of device configuration requests, description thereof is omitted.

Figure 8:
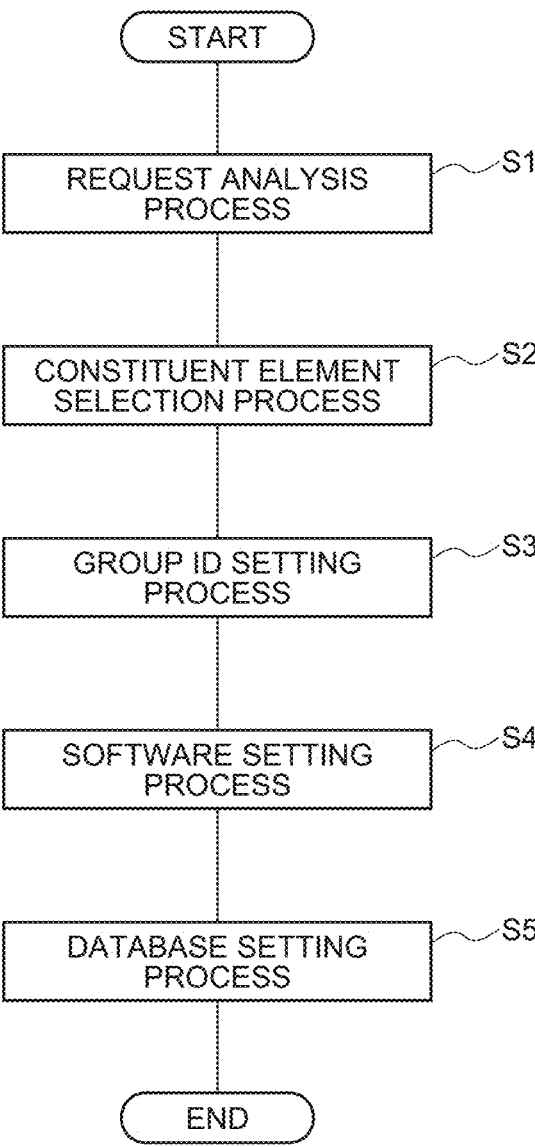
FIG. 8 is a flowchart illustrating an example of a process performed by a device configuration management unit according to the first example embodiment of the present disclosure.

FIG. 8 is a flowchart illustrating an example of processing performed by the device configuration management unit 561. The device configuration management unit 561 initiates processing illustrated in FIG. 8 upon receipt of a device configuration request. First, the device configuration management unit 561 analyzes the device configuration request (step S1). Then, the device configuration management unit 561 performs a satellite selection process (step S2).

In the case of a device new configuration request, at step S2, the device configuration management unit 561 selects the host 21 and the I/O device 31 satisfying the conditions included in the device new configuration request. Specifically, the device configuration management unit 561 first refers to the satellite database 552 to create a list of the hosts 21 in which the information processing device number 55236 is NULL, the specifications 55232 satisfy the conditions related to the host included in the device new configuration request, and the status 55233 is a normal state. Then, the device configuration management unit 561 refers to the satellite database 552 to create a list of the I/O devices 31 in which the information processing device number 55256 is NULL, the specifications 55252 satisfy the conditions related to the I/O device included in the device new configuration request, and the status 55253 is a normal state. Then, from the list of the host 21 and the list of the I/O devices 31, the device configuration management unit 561 selects the required number of hosts 21 and I/O devices 31. This selection may be performed at random, or performed according to a desired policy. For example, selection may be performed in such a manner that the number of satellites 2 to 4 including the selected hosts 21 and the I/O device 31 becomes minimum. Alternatively, selection may be performed in such a manner that the distance between the satellites 2 to 4 including the selected hosts 21 and the I/O device 31 becomes minimum. In the case where the device configuration management unit 561 cannot select the required number of hosts 21 and I/O devices 31, new configuration is suspended.

In the case of a device extension request, at step S2, the device configuration management unit 561 selects the hosts 21 and/or the I/O devices 31 satisfying the conditions included in the device extension request. Specifically, the device configuration management unit 561 creates a list of the hosts 21 and/or the I/O devices 31 satisfying the conditions from the satellite database 552 by means of a method similar to that in the case of device new configuration request, and from the list, selects the required number of hosts 21 and/or I/O devices 31. In the case where the device configuration management unit 561 cannot select the required number of hosts 21 and/or I/O devices 31, device expansion is suspended.

In the case of a device degeneration request, a device deletion request, and a device function change request, at step S2, the device configuration management unit 561 does not perform any particular processing.

Then, the device configuration management unit 561 performs a group ID setting process (step S3).

In the case of a device new configuration request, at step S3, the device configuration management unit 561 adopts a group ID to be assigned to a new information processing device, and sets the adopted group ID to the host-side bridge 22 of the host 21 and the I/O-side bridge 32 of the I/O device 31 selected at step S2. Setting of the group ID to the host-side bridge 22 and the I/O-side bridge 32 is performed by transmitting a control frame addressed to the host-side bridge 22 and the I/O-side bridge 32 from the device configuration management unit 561 to the Ethernet communication device 54. The destination MAC address is acquired from the MAC addresses 55234 and 55254 corresponding to the selected host 21 and the I/O device 31. The host-side bridge 22 and the I/O-side bridge 32 that received the control frame update the own group ID to the group ID included in the control frame. Each of the host-side bridge 22 and the I/O-side bridge 32 in which the same group ID is set constitutes a virtual PCIe switch. Thereby, a new information processing device including the hosts 21 and the I/O devices 32 as constituent elements that are arranged in a distributed manner in the satellites 2 to 4 is formed.

In the case of a device extension request, at step S3, the device configuration management unit 561 searches the information processing device database 554 for the group ID 5542 assigned to the information processing device desired to be extended, by using the number of the information processing device to be extended as a key. Then, the device configuration management unit 561 sets a group ID that is the same as the group ID acquired through the search, to the host-side bridge 22 of the host 21 and/or the I/O-side bridge 32 of the I/O device 31 selected at step S2, by the control frame. As a result, the host 21 and/or the I/O device 31 are newly added to the information processing device as constituent elements.

In the case of a device degeneration request, at step S3, the device configuration management unit 561 deletes the group ID set to the host-side bridge 22 of the host 21 and/or the I/O-side bridge 32 of the I/O device 31 that are not required any more, by the control frame. As a result, the host 21 and/or the I/O device 31 that are not required any more are logically removed from the information processing device. The logically removed host or I/O device needs a necessity minimum power supply, which suppresses power consumption.

In the case of a device deletion request, at step S3, the device configuration management unit 561 deletes the group ID set to all of the host-side bridge 22 of the host 21 and the I/O-side bridge 32 of the I/O device 31 of the information processing device to be deleted, by the control frame. As a result, all of the hosts 21 and the I/O devices 31 of the information processing device desired to be deleted are logically removed from the information processing device. The logically removed host or I/O device needs a necessity minimum power supply, which suppresses power consumption.

In the case of a device function change request, at step S3, the device configuration management unit 561 does not perform any particular processing.

Then, the device configuration management unit 561 performs a software setting process (step S4).

In the case of a device new configuration request, at step 4, the device configuration management unit 561 checks whether or not a program satisfying the conditions included in the device new configuration request has been installed in the host 21 of the newly configured information processing device. Specifically, the device configuration management unit 561 refers to specifications 55232 corresponding to the host 21 of the newly configured information processing device from the satellite database 552, and determines whether or not the type and the version of the program recorded in the specifications 55232 satisfy the conditions of the program included in the device new configuration request. When the installed program satisfies the conditions, the device configuration management unit 561 normally ends the software setting process S4. On the other hand, when the program does not satisfy the conditions, the device configuration management unit 561 selects a program satisfying the conditions from the software database 553. When the device configuration management unit 561 cannot select a program satisfying the conditions, the device configuration management unit 561 suspends the software setting process S4. When the device configuration management unit 561 can select a program satisfying the conditions, the device configuration management unit 561 transmits the selected program to the corresponding host 21 by a control frame via the Ethernet communication device 54. The host 21 that received the program uninstalls the installed program as required, and then installs the received program.

In the case of a device extension request, at step 4, the device configuration management unit 561 checks whether or not a program satisfying the conditions included in the device extension request has been installed in the added host 21. When the installed program satisfies the conditions, the device configuration management unit 561 normally ends the software setting process S4. On the other hand, when the program does not satisfy the conditions, the device configuration management unit 561 selects a program satisfying the conditions from the software database 553. When the device configuration management unit 561 cannot select a program satisfying the conditions, the device configuration management unit 561 suspends the software setting process S4. When the device configuration management unit 561 can select a program satisfying the condition, the device configuration management unit 561 transmits the selected program to the corresponding host 21 by a control frame via the Ethernet communication device 54. The host 21 that received the program uninstalls the installed program as required, and then installs the received program. The process when the host 21 is added by device expansion is as described above. When the I/O device 31 is added by device extension but the host 21 is not added, the device configuration management unit 561 does not perform any particular processing at step S4.

In the case of a device deletion request, at step S4, the device configuration management unit 561 does not perform any particular processing.

In the case of a device function change request, at step S4, the device configuration management unit 561 selects a program satisfying the conditions included in the device function change request from the software database 553. When the device configuration management unit 561 cannot select a program satisfying the conditions, the device configuration management unit 561 suspends the software setting process S4. When the device configuration management unit 561 can select a program satisfying the condition, the device configuration management unit 561 transmits the selected program to the host 21 whose function will be changed, by a control frame via the Ethernet communication device 54. The host 21 that received the program uninstalls the installed program as required, and then installs the received program.

Then, the device configuration management unit 561 performs a process of setting the satellite database 552 and the information processing device database 554 (step S5).

In the case of a device new configuration request, at step S5, the device configuration management unit 561 generates a set of entries corresponding to the newly configured information processing device in the information processing device database 554, and sets necessary information in the entries. Specifically, an information processing device number 5541 adopted for the newly configured information processing device, a group ID 5542 set thereto, the number of hosts 5543, host information 5544, the number of I/O devices 5545, and I/O device information 5546, are added to the information processing device database 554. Further, the device configuration management unit 561 updates the group ID 55235, the information processing device number 55236, the group ID 55255, and the information processing device number 55256 in the satellite database 552 corresponding to the host 21 and the I/O device 31 that are constituent elements of the newly configured information processing device.

In the case of a device extension request, at step S5, the device configuration management unit 561 updates the number of hosts 5543 corresponding to the extended information processing device in the information processing device database 554 according to the added host 21, and inserts new host information 5544 related to the added host 21. Moreover, the device configuration management unit 561 updates the number of I/O devices 5545 corresponding to the extended information processing device in the information processing device database 554 according to the added I/O device 31, and inserts new I/O device information 5546 related to the added I/O device 31. Further, the device configuration management unit 561 updates the group ID 55235 and the information processing device number 55236 in the host information 5523 corresponding to the added host 21 in the satellite database 552, according to the added host 21. Further, the device configuration management unit 561 updates the group ID 55255 and the information processing device number 55256 of the I/O device information 5525 corresponding to the added I/O device 31 in the satellite database 552, according to the added I/O device 31.

In the case of a device degeneration request, at step S5, the device configuration management unit 561 updates the number of hosts 5543 corresponding to the degenerated information processing device in the information processing device database 554 according to the removed host 21, and deletes the host information 5544 corresponding to the removed host 21. Moreover, the device configuration management unit 561 updates the number of I/O devices 5545 corresponding to the degenerated information processing device in the information processing device database 554 according to the removed I/O device 31, and deletes the I/O device information 5546 corresponding to the removed I/O device 31. Further, the device configuration management unit 561 updates the group ID 55235 and the information processing device number 55236 of the host information 5523 corresponding to the removed host 21 in the satellite database 552 to NULL, according to the removed host 21. Further, the device configuration management unit 561 updates the group ID 55255 and the information processing device number 55256 of the I/O device information 5525 corresponding to the removed I/O device 31 in the satellite database 552 to NULL, according to the removed I/O device 31.

In the case of a device deletion request, at step S5, the device configuration management unit 561 deletes the set of entries related to the information processing device deleted from the information processing device database 554. Further, the device configuration management unit 561 updates the group ID 55235 and the information processing device number 55236 in the host information 5523 corresponding to the deleted host 21 in the satellite database 552 to NULL, according to the host 21 included in the deleted information processing device. Further, the device configuration management unit 561 updates the group ID 55255 and the information processing device number 55256 in the I/O device information 5525 corresponding to the deleted I/O device 31 in the satellite database 552 to NULL, according to the I/O device 31 included in the deleted information processing device.

In the case of a device function change request, at step S5, the device configuration management unit 561 updates the program information in the specifications 55232 in the host information 5523 corresponding to the host 21 of the satellite in which the program has been changed in the satellite database 552, according to the host 21 in which the program has been changed.

The device configuration management unit 561 has been described above. Next, the failure management unit 562 will be described.

The failure management unit 562 checks presence/absence of a failure in the host 21, the host-side bridge 22, the I/O device 31, and the I/O-side bridge 32 mounted on the satellites 2 to 4. For example, the failure management unit 562 determines whether or not reception of control frames regularly transmitted from the host-side bridge 22 and the I/O-side bridge 32 is interrupted to thereby check presence or absence of a failure in the host-side bridge 22 and the I/O-side bridge 32. Further, the failure management unit 562 determines whether or not reception of control frames regularly transmitted from the host-side bridge 22 and the I/O-side bridge 32 is interrupted to thereby check presence or absence of a failure in the host 21 and the I/O device 31. When the failure management unit 562 detects that a failure has occurred in the host 21 and/or the host-side bridge 22, the failure management unit 562 updates the status 55233 in the satellite database 552 to a failed state, and displays failure information on the screen display unit 53 and/or transmits the failure information to an external device via the communication I/F unit 51. Further, when the failure management unit 562 detects that a failure has occurred in the I/O device 31 and/or the I/O-side bridge 32, the failure management unit 562 updates the status 55253 in the satellite database 552 to a failed state, and displays the failure information on the screen display unit 53 and/or transmits the failure information to an external device via the communication I/F unit 51. As a result, an operator of the management device 5 or a user of the external device can check presence or absence of a failure in the host 21 and the I/O device 31 arranged in a distributed manner in the satellites 2 to 4 at real time, according to the failure information.

Further, in the host and I/O-mounted satellite 4 in which a failed state of the host 21 and/or the host-side bridge 22 is detected by the failure management unit 562, when the I/O device 31 and the I/O-side bridge 32 are in a normal state, the host and I/O-mounted satellite 4 is managed and used as an I/O-mounted satellite. In the host and I/O-mounted satellite 4 in which a failed state of the I/O device 31 or/and the I/O-side bridge 32 is detected by the failure management unit 562, when the host 21 and the host-side bridge 22 are in a normal state, the host and I/O-mounted satellite 4 is managed and used as a host-mounted satellite.

The display control unit 563 displays, on the screen display unit 53, the configuration of the information processing device formed by the satellite platform 1 by visualizing it, according to a display request input from the operation input unit 52. For example, when an information processing device configuration display request designating the information processing device number is input, the display control unit 563 acquires a set of entries related to the information processing device specified by the designated information processing device number, from the database 554. Then, the display control unit 563 creates a diagram in which the configuration of the information processing device is visualized based on the acquired information, displays it on the screen display unit 53, or/and transmits it to an external device via the communication I/F unit 51. In the configuration diagram in which the information processing device is visualized, the display control unit 563 may display the specifications 55232 of the host, the status 55233, the specifications 55252 of the I/O device 31, and the status 55253, acquired from the satellite database 552, in text. As a result, an operator and the like can immediately check the configuration and the status of the information processing device formed by the satellite platform 1, as required.

Next, some examples of information processing devices formed by the satellite platform 1 will be described.

Figure 9:
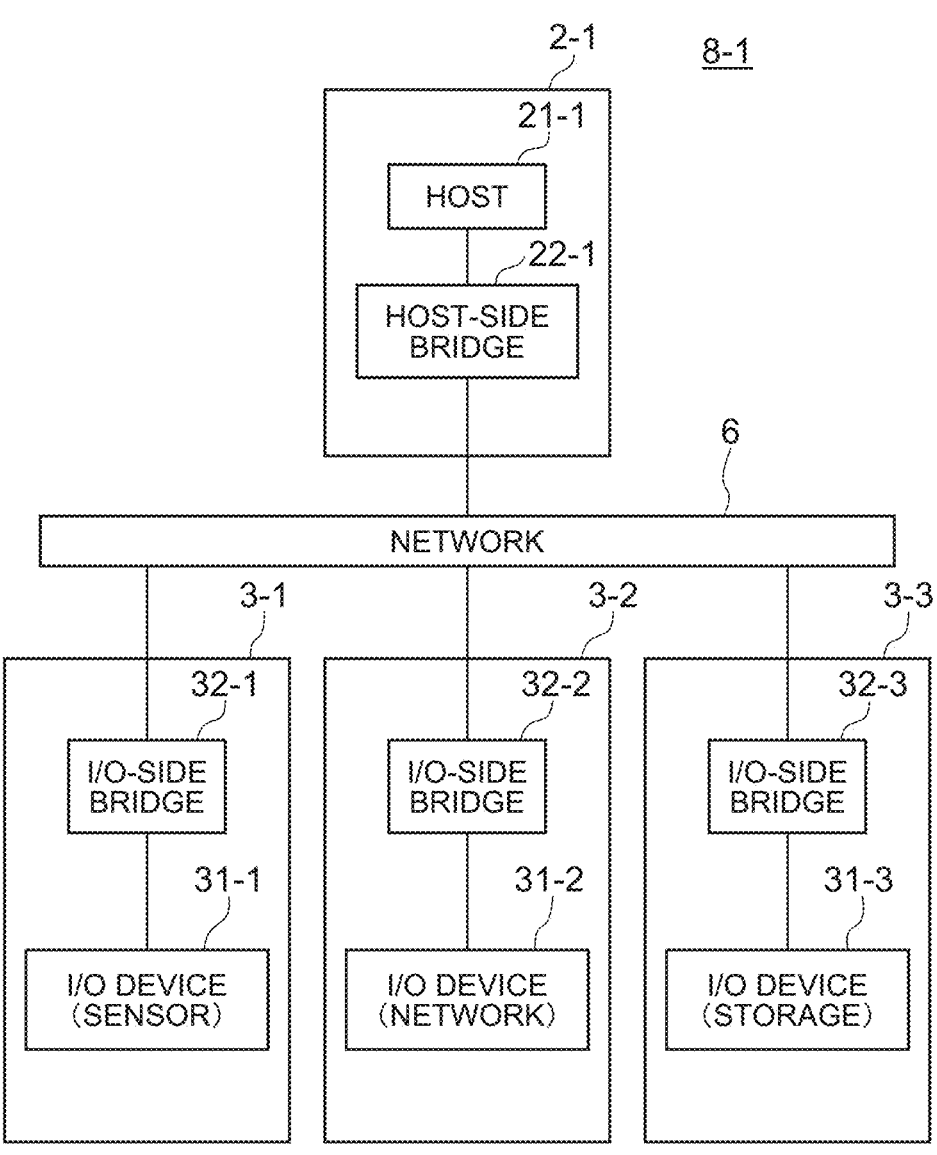
FIG. 9 is a block diagram illustrating an example of an information processing device formed by a satellite platform according to the first example embodiment of the present disclosure.

FIG. 9 is a block diagram illustrating an example of an information processing device formed by the satellite platform 1. An information processing device 8-1 of this example is configured of four satellites, namely a satellite 2-1 having a data processing role, a satellite 3-1 having a sensor role, a satellite 3-2 having a network role, and a satellite 3-3 having a storage role. That is, it is configured to include a host 21-1, an I/O device (sensor) 31-1, an I/O device (network) 31-2, and an I/O device (storage) 31-3 that are arranged in a distributed manner in the four satellites. The host 21-1 is connected with the network 6 via a host-side bridge 22-1, the I/O device (sensor) 31-1 is connected with the network 6 via an I/O-side bridge 32-1, the I/O device (network) 31-2 is connected with the network 6 via an I/O-side bridge 32-2, and the I/O device (storage) 31-3 is connected with the network 6 via an I/O-side bridge 32-3. Here, the host-side bridge 22-1, the I/O-side bridge 32-1, the I/O-side bridge 32-2, and the I/O-side bridge 32-3 constitute a virtual PCIe switch. The information processing device 8-1 illustrated in FIG. 9 conducts a mission to sense a physical condition of the earth surface by the I/O device (sensor) 31-1 and accumulate it in the I/O device (storage) 31-3 for a certain period of time, analyze the accumulated sensed data by the host 21-1, and transmit the analysis result to a center on the earth ground by the I/O device (network) 31-2, for example.

Figure 10:
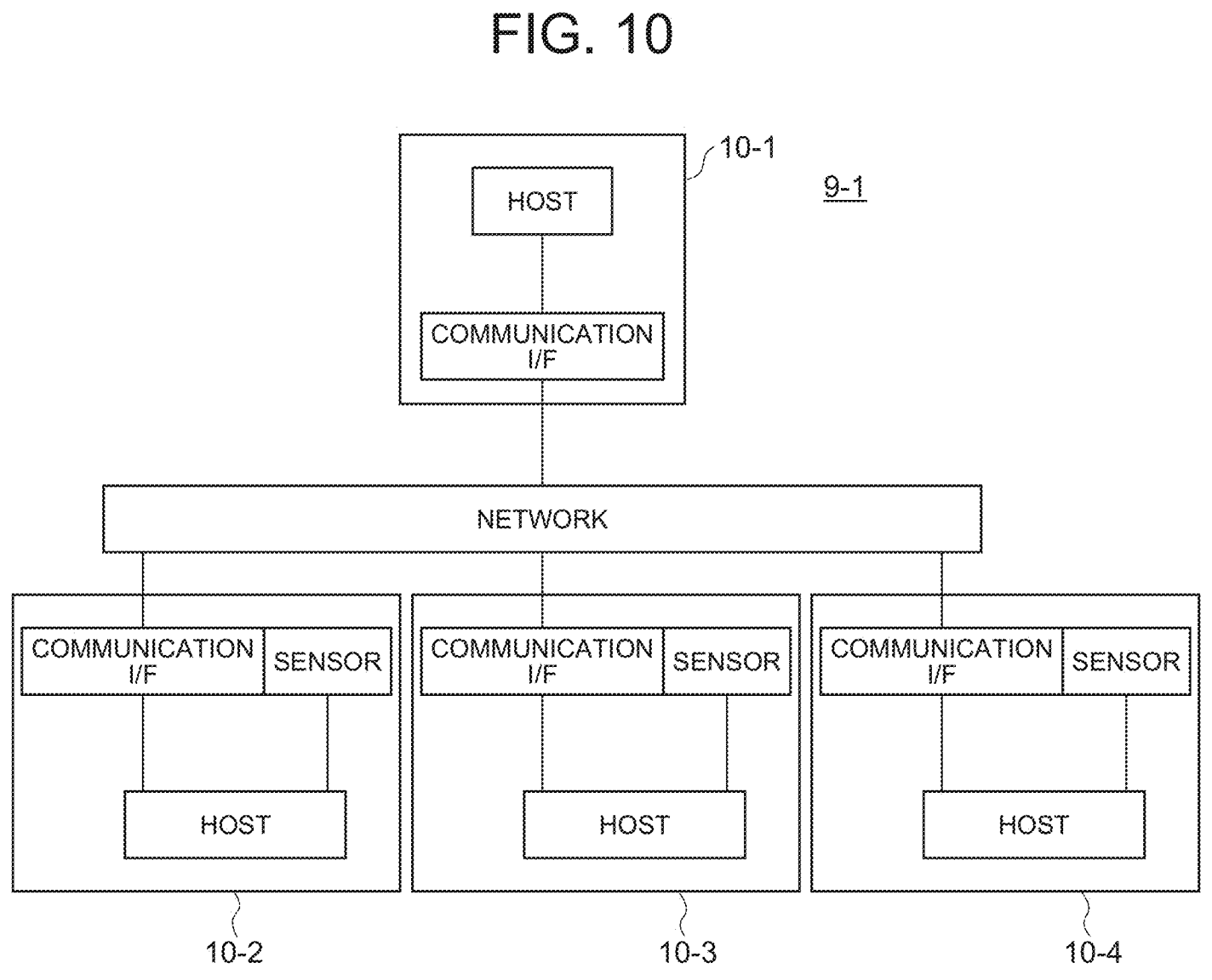

Meanwhile, FIG. 10 is a block diagram illustrating an example of a configuration of a satellite cluster 9-1 that conducts a mission similar to that of FIG. 9. The satellite cluster 9-1 of this example is configured to include a satellite 10-1 having a data processing role, a satellite 10-2 having a sensor role, a satellite 10-3 having a network role, and a satellite 10-4 having a storage role. Among the respective satellites, data transmission and reception are performed by computer communication. Therefore, hosts are also mounted on the satellites 10-2 to 10-4 whose roles are limited to a sensor role, a network role, and a storage role.

As clear from comparison between FIG. 9 and FIG. 10, according to the information processing device 8-1 of the present disclosure, a host is not required in the satellite 3-1 taking on a sensor role, the satellite 3-2 taking on a network role, and the satellite 3-3 taking a storage role. Therefore, as compared with the satellite cluster 9-1 illustrated in FIG. 10, it is possible to realize downsizing of the satellites, cost reduction, reduction of the required heat discharge amount, and the like. Moreover, for the satellites 3-1 to 3-3 that do not required hosts, it does not need to worry about malfunction caused by radioactive rays in the space environment.

Figure 11:
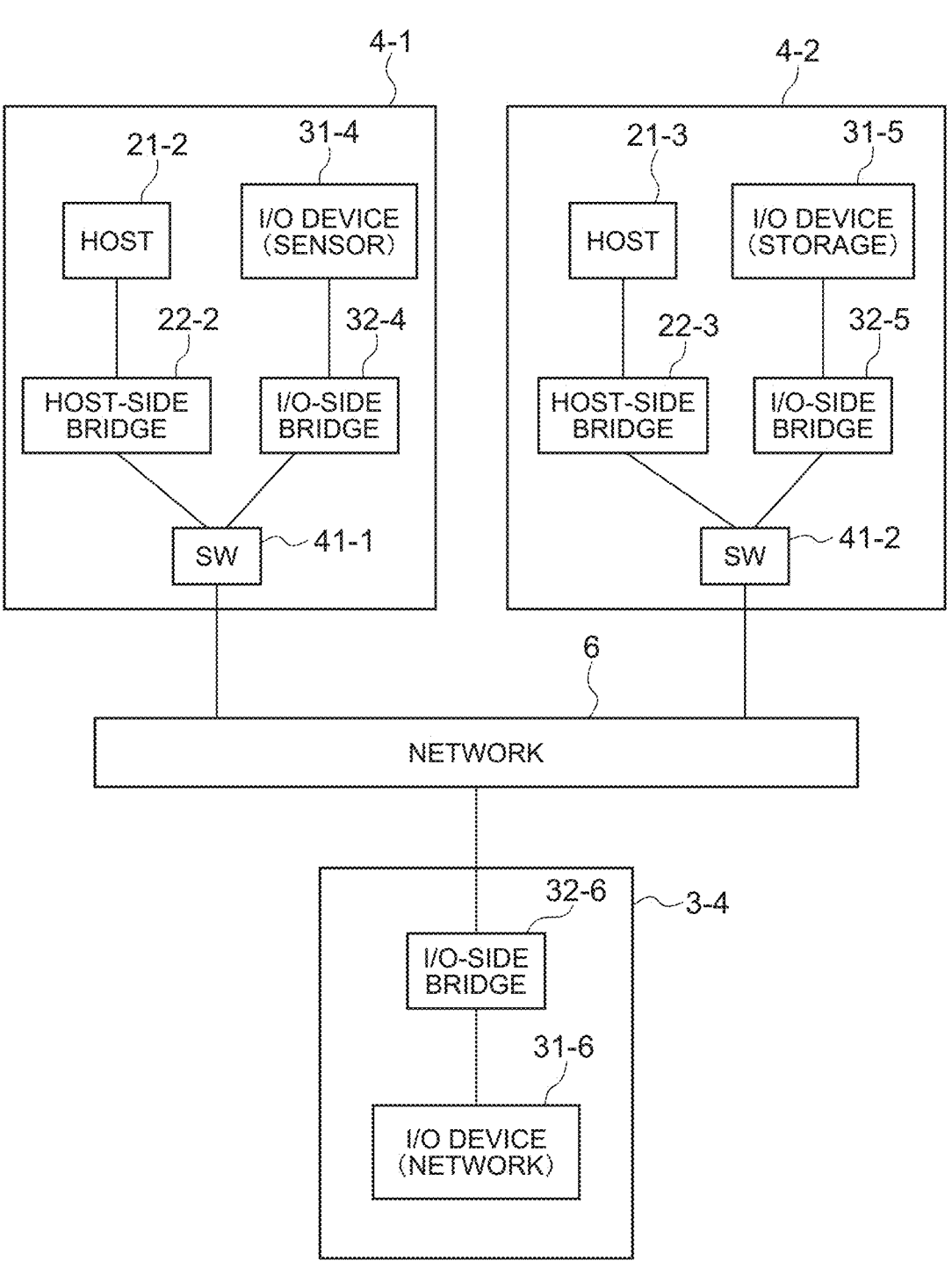
FIG. 11 is a block diagram illustrating another example of an information processing device formed by a satellite platform according to the first example embodiment of the present disclosure.

FIG. 11 is a block diagram illustrating another example of an information processing device formed by the satellite platform 1. An information processing device 8-2 of this example is configured of three satellites, namely a satellite 4-1 having a data processing role and a sensor role, a satellite 4-2 having a data processing role and a storage role, and a satellite 3-4 having a network role. That is, it is configured to include a host 21-2, a host 21-3, an I/O device (sensor) 31-4, an I/O device (storage) 31-5, and an I/O device (network) 31-6 that are arranged in a distributed manner in the three satellites. The host 21-2 is connected with the network 6 via a host-side bridge 22-2 and an Ethernet switch 41-1, the I/O device (sensor) 31-1 is connected with the network 6 via an I/O-side bridge 32-1 and the Ethernet switch 41-1, the host 21-3 is connected with the network via a host-side bridge 22-3 and an Ethernet switch 41-2, the I/O device (storage) 31-5 is connected with the network 6 via an I/O-side bridge 32-5 and the Ethernet switch 41-2, and the I/O device (network) 31-6 is connected with the network 6 via an I/O-side bridge 32-6. Here, the host-side bridges 22-2 and 22-3 and the I/O-side bridges 32-4 to 32-6 constitute a virtual PCIe switch. The information processing device 8-2 illustrated in FIG. 11 is redundant in which the host 21-2 is an active system and the host 21-3 is a standby system, for example. For example, the information processing device 8-2 performs a mission to sense a physical condition of the earth surface by the I/O device (sensor) 31-4 and accumulate it in the I/O device (storage) 31-5 for a certain period of time, analyze the accumulated sensed data by the host 21-2 of the actual system, and transmit the analysis result to a sensor on the earth ground by the I/O device (network) 31-6, for example. When the host 21-2 of the actual system is down due to a failure, the host 21-3 of the standby system continues the processing as a new active system.

Figure 12:
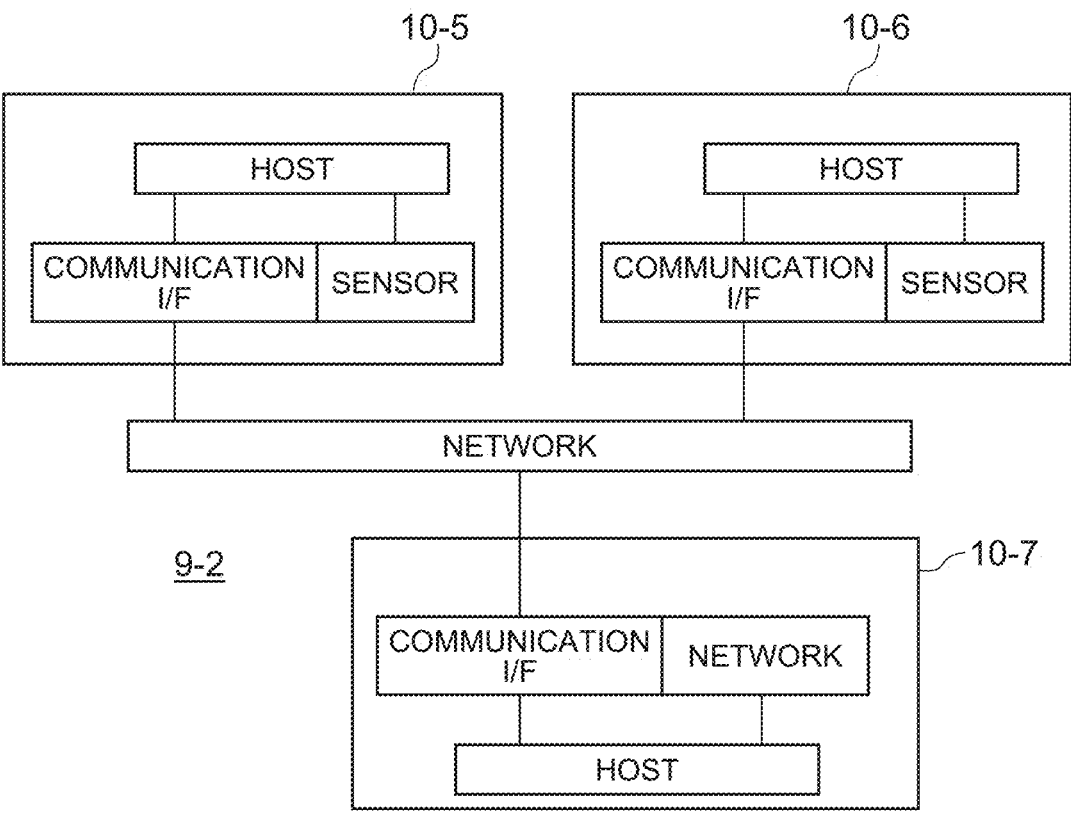
FIG. 12 is a block diagram illustrating another example of a configuration of a satellite cluster by an existing technology.

Meanwhile, FIG. 12 is a block diagram illustrating an example of a configuration of a satellite cluster 9-2 that conducts a mission similar to that of FIG. 11. The satellite cluster 9-2 of this example is configured to include a satellite 10-5 having a data processing role and a sensor role, a satellite 10-6 having a data processing role and a storage role, and a satellite 10-7 having a network role. Among the respective satellites, data transmission and reception are performed by computer communication. Therefore, a host is also mounted on the satellite 10-7 whose role is limited to a network role.

As clear from comparison between FIG. 11 and FIG. 12, according to the information processing device 8-2 of the present disclosure, a host is not required in the satellite 3-4 taking on a network role. Therefore, as compared with the satellite cluster 9-2 illustrated in FIG. 12, it is possible to realize downsizing of the satellite, cost reduction, reduction of the required heat discharge amount, and the like. Moreover, for the satellite 3-4 that does not require a host, it does not need to worry about malfunction caused by radioactive rays in the space environment.

Further, the satellite cluster 9-2 illustrated in FIG. 12 may be redundant because the host mounted on one of the three satellites operates as an actual system and the host of either one of the two remaining satellites operates as a standby system However, in the case where a failure occurs when the host mounted on the satellite 105 operates as an actual system and the host is down, the sensor mounted on the same satellite 10-5 cannot perform communication with the computers of other satellites, so that it is not operable. This is also the same in the case where the host mounted on another satellite 10-6 or 10-7 is used as an actual system. When the host in the actual system fails, the storage and the network mounted on the same satellite as the host in the actual system cannot be used. As described above, in the satellite cluster 9-2, the satellite in which the mounted host failed and no normal host exists does not have any utility value as the entire satellite even though the mounted I/O device is normal.

On the other hand, in the information processing device 8-2 according to the present disclosure illustrated in FIG. 11, even when the host 21-2 of the actual system mounted on the satellite 4-1 failed and is down, the I/O device (sensor) 31-4 mounted on the same satellite 4-1 will not be affected by the failure in the host 21-2, and can be used continuously as a normal I/O device. This is because when the I/O device 31-4 is connected with the host-side bridge 22-3 via the I/O-side bridge 32-4, it is usable as an I/O device connected with host 21-3. In this way, in the host and I/O-mounted satellite 4, the I/O device mounted thereon can be used continuously even when the host mounted thereon failed. Therefore, it is possible to extend the substantial life of the satellite.

Second Example Embodiment

Next, a second example embodiment of the present disclosure will be described with reference to the drawings. The present embodiment describes a basic configuration of a satellite platform according to the present disclosure.

Figure 13:
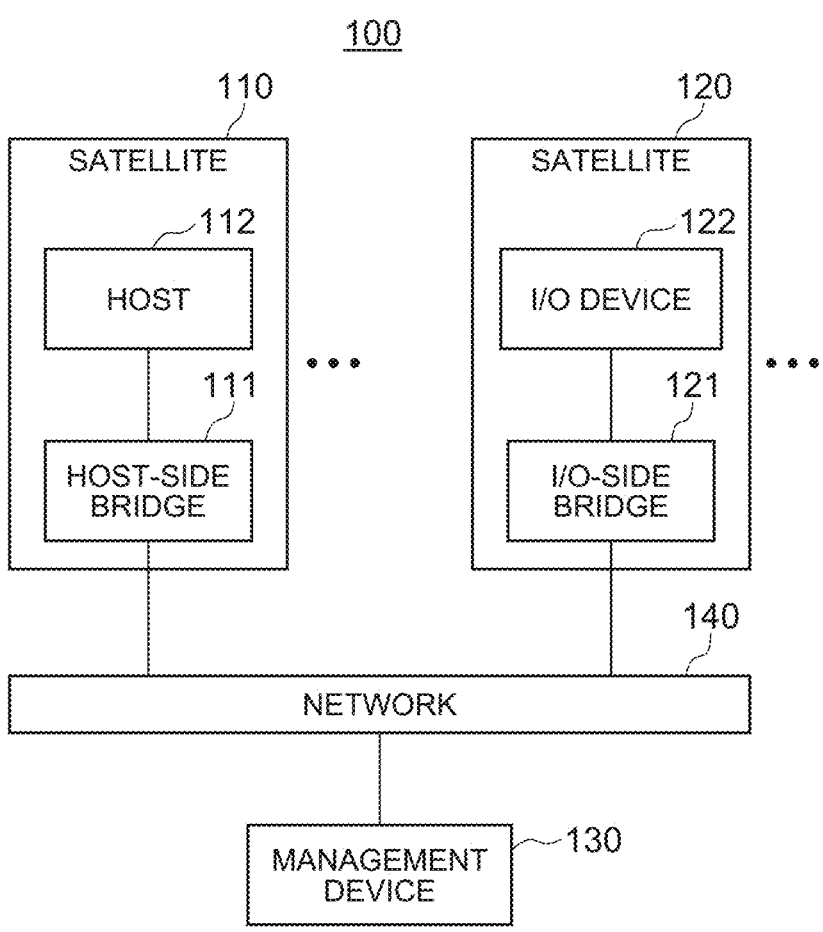
FIG. 13 is a block diagram illustrating a satellite platform according to a second example embodiment of the present disclosure.

FIG. 13 is a block diagram illustrating a satellite platform according to the present embodiment. Referring to FIG. 13, a satellite platform 100 is configured of one or more first satellites 110, one or more second satellites 120, a management device 130, and a network 140 connecting them with each other.

The first satellite 110 includes a host-side bridge 111 and a host 112, connected with a network 140 via the host-side bridge 111, mounted thereon. The second satellite 120 includes an I/O-side bridge 121 and an I/O device 122, connected with the network 140 via the I/O-side bridge 121, mounted thereon.

The management device 130 is configured to form an information processing device including hosts and I/O devices arranged in a distributed manner on the satellites 110 and 120 as constituent elements, according to a request for configuring the information processing device. Specifically, the management device 130 is configured to select the host 112 mounted on at least one of the first satellites 110 and the I/O device 122 mounted on at least one of the second satellites 120. The management device is also configured to form an information processing device in which the host-side bridge 111 connected with the selected host 112 and the I/O-side bridge 121 connected with the selected I/O device 122 form a virtual computer internal bus.

The satellite platform configured as described above operates as described below. First, the management device 130 selects the host 112 mounted on at least one of the first satellites 110 and the I/O device 122 mounted on at least one of the second satellites 120, according to a request for configuring an information processing device. Then, the management device 130 forms an information processing device in which the host-side bridge 111 connected with the selected host 112 and the I/O-side bridge 121 connected with the selected I/O device 122 form a virtual computer internal bus.

According to the satellite platform 100 that is configured and operates as described above, a host is not necessarily mounted on the second satellite 120 as mission equipment.

Third Example Embodiment

Next, a third example embodiment of the present disclosure will be described with reference to the drawings. The present embodiment describes a basic configuration of an information processing device according to the present disclosure.

Figure 14:
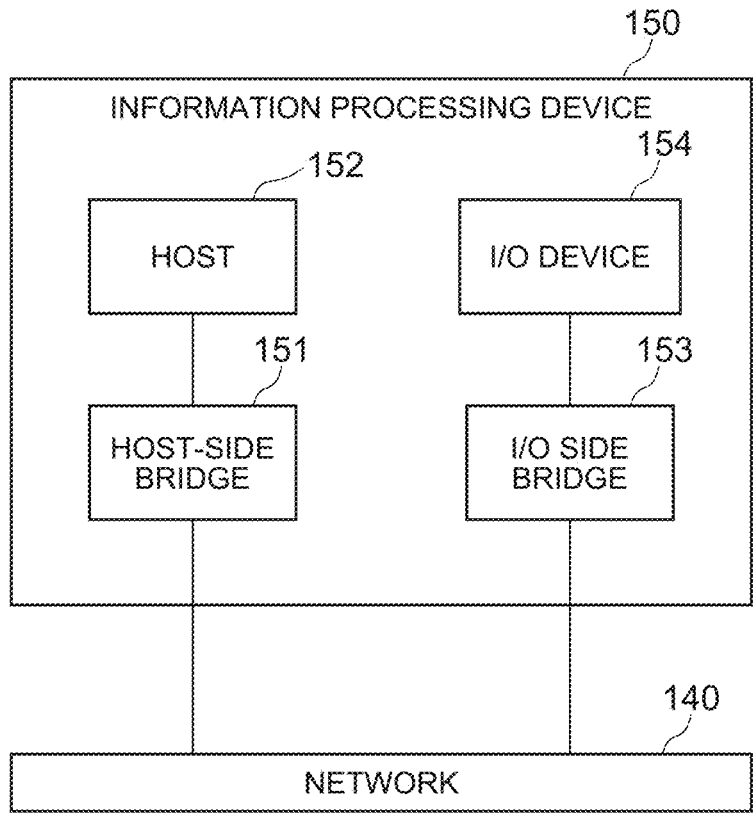
FIG. 14 is a block diagram illustrating an information processing device according to a third example embodiment of the present disclosure.

FIG. 14 is a block diagram illustrating an information processing device according to the present embodiment. Referring to FIG. 14, an information processing device 150 includes a host-side bridge 151, a host 152, an I/O-side bridge 153, and an I/O device 154. The host 152 is connected with the network 140 via the host-side bridge 151. The I/O device 154 is connected with the network 140 via the I/O-side bridge 153. The host-side bridge 151 and the host 152 are mounted on a satellite (first satellite). The I/O-side bridge 153 and the I/O device 154 are mounted on another satellite (second satellite) that is different from the first satellite. The host-side bridge 151 and the I/O-side bridge 153 form a virtual computer internal bus.

According to the information processing device 150 of the present embodiment, since the host 152 and the I/O device 154 transmit and receive data via a virtual computer internal bus, computer communication is not needed. Therefore, a host is not necessarily mounted as mission equipment on the second satellite equipped with the I/O device 154.

Fourth Example Embodiment

Next, a fourth example embodiment of the present disclosure will be described with reference to the drawings. The present embodiment describes a basic configuration of a satellite according to the present disclosure.

Figure 15:
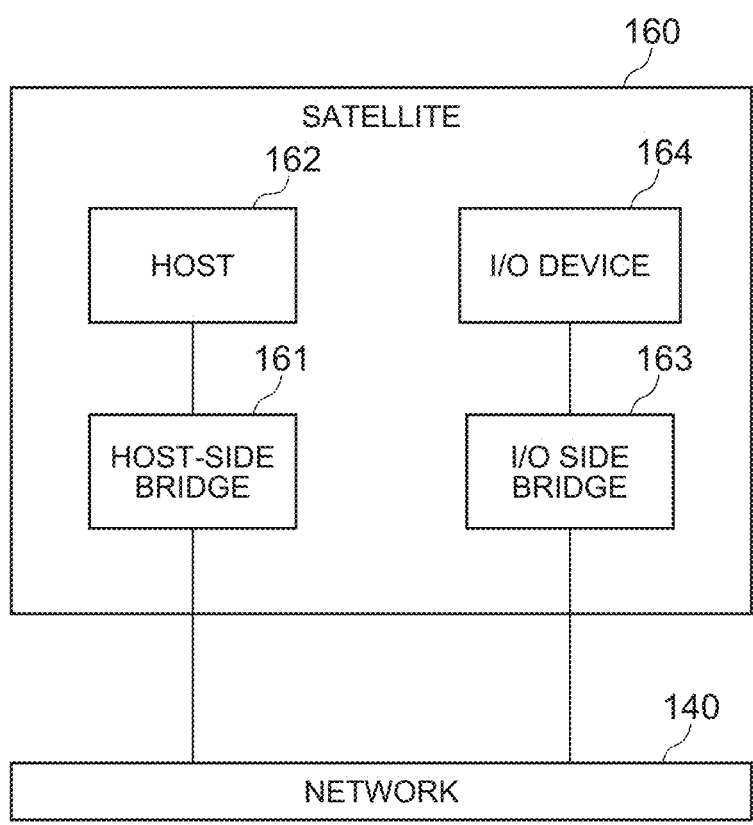
FIG. 15 is a block diagram illustrating a satellite according to a fourth example embodiment of the present disclosure.

FIG. 15 is a block diagram illustrating a satellite according to the present embodiment. Referring to FIG. 15, a satellite 160 includes a host-side bridge 161, a host 162, an I/O-side bridge 163, and an I/O device 164, as mission equipment. The host 162 is connected with the network 140 via the host-side bridge 161. The I/O device 164 is connected with the network 140 via the I/O-side bridge 163. An Ethernet switch may be provided between the host-side bridge 161, the I/O-side bridge 163, and the network 140.

According to the satellite 160 of the present embodiment, even when the host 162 is down due to a failure that occurred in the host 162, the I/O device 164 can be used continuously as a normal I/O device without being affected by the failure in the host 162. This is because when the I/O device 164 is connected with the host-side bridge of another satellite not illustrated via the I/O-side bridge 163 and the network 140, it can be used as an I/O device from the host of the other satellite. As described above, in the satellite 160, even when the host mounted thereon has failed, the I/O device can be used continuously. Therefore, it is possible to extend the substantial life of the satellite.

While the present disclosure has been described with reference to the example embodiments described above, the present disclosure is not limited to the above-described embodiments. The form and details of the present disclosure can be changed within the scope of the present disclosure in various manners that can be understood by those skilled in the art.

For example, it is possible to divide hosts and I/O devices in one satellite into a plurality of groups, and respective groups may be used as constituent elements of respective information processing devices that are different from each other.

Furthermore, by using a virtualizing program for example, it is possible to form a plurality of virtual information processing devices on an information processing device formed as described above.

Moreover, instead of the CPU, the information processing device may use a Graphic Processing Unit (GPU), a Digital Signal Processor (DSP), a Micro Processing Unit (MPU), a Floating number Processing Unit (FPU), a Physics Processing Unit (PPU), a Tensor Processing Unit (TPU), a quantum processor, a microcontroller, or a combination thereof.

INDUSTRIAL APPLICABILITY

The present disclosure is applicable to the entire fields of forming an information processing device by connecting hosts and I/O devices arranged in a distributed manner in a plurality of satellites.

The whole or part of the example embodiments disclosed above can be described as, but not limited to, the following supplementary notes.

(Supplementary Note 1)

A satellite platform comprising:

one or more first satellites on each of which a first host-side bridge and a first host are mounted, the first host being connected with a network via the first host-side bridge:

one or more second satellites on each of which a first I/O-side bridge and a first I/O device are mounted, the first I/O device being connected with the network via the first I/O-side bridge; and a management device configured to select the first host mounted on at least one of the first satellites and the first I/O device mounted on at least one of the second satellites, according to a configuration request, and form an information processing device in which the first host-side bridge connected with the selected first host and the first I/O-side bridge connected with the selected first I/O device constitute a virtual computer internal bus.

(Supplementary Note 2)

The satellite platform according to supplementary note 1, further comprising one or more third satellites on each of which a second host-side bridge, a second host, a second I/O-side bridge, and a second I/O device are mounted, the second host being connected with the network via the second host-side bridge, the second I/O device being connected with the network via the second I/O-side bridge, wherein the management device is configured to select the first host or the second host mounted on at least one of the first satellites and the third satellites, and the first I/O device or the second I/O device mounted on at least one of the second satellites and the third satellites, according to the configuration request, and form an information processing device in which the first host-side bridge or the second host-side bridge connected with the selected first host or the second host and the first I/O-side bridge or the second I/O-side bridge connected with the selected first I/O device or the second I/O device constitute a virtual computer internal bus.

(Supplementary Note 3)

The satellite platform according to supplementary note 2, wherein the management device uses, as the second satellite, the third satellite that does not have any set of the second host and the second host-side bridge in a normal state due to a failure in the second host or the second host-side bridge mounted on the third satellite.

(Supplementary Note 4)

The satellite platform according to supplementary note 2, wherein the management device uses, as the first satellite, the third satellite that does not have any set of the second I/O device and the second I/O-side bridge in a normal state due to a failure in the second I/O device or the second I/O-side bridge mounted on the third satellite.

(Supplementary Note 5)

The satellite platform according to supplementary note 1, wherein each of the first host-side bridge and the first I/O-side bridge is a PCI Express bus extension bridge.

(Supplementary Note 6)

A method of forming an information processing device, the method being executed by a computer connected with, over a network, one or more first satellites on each of which a first host-side bridge and a first host are mounted and one or more second satellites on each of which a first I/O-side bridge and a first I/O device are mounted, the first host being connected with the network via the first host-side bridge, the first I/O device being connected with the network via the first I/O-side bridge, the method comprising:

selecting the first host mounted on at least one of the first satellites and the first I/O device mounted on at least one of the second satellites, according to a configuration request; and forming an information processing device in which the first host-side bridge connected with the selected first host and the first I/O-side bridge connected with the selected first I/O device constitute a virtual computer internal bus.

(Supplementary Note 7)

A program for causing a computer to execute processing to, the computer being connected with, over a network, one or more first satellites on each of which a first host-side bridge and a first host are mounted and one or more second satellites on each of which a first I/O-side bridge and a first I/O device are mounted, the first host being connected with the network via the first host-side bridge, the first I/O device being connected with the network via the first I/O-side bridge:

select the first host mounted on at least one of the first satellites and the first I/O device mounted on at least one of the second satellites, according to a configuration request; and form an information processing device in which the first host-side bridge connected with the selected first host and the first I/O-side bridge connected with the selected first I/O device constitute a virtual computer internal bus.

(Supplementary Note 8)

An information processing device comprising:

a first host of a first satellite on which a first host-side bridge and the first host are mounted, the first host being connected with a network via the first host-side bridge; and an I/O device of a second satellite on which a first I/O-side bridge and the first I/O device are mounted, the first I/O device being connected with the network via the first I/O-side bridge, wherein the first host-side bridge and the first I/O-side bridge constitute a virtual computer internal bus.

(Supplementary Note 9)

A satellite comprising:

a host-side bridge;

a host connected with a network via the host-side bridge;

an I/O side bridge; and an I/O device connected with the network via the I/O-side bridge.

REFERENCE SIGNS LIST 1 satellite platform
2-4 satellite
5 management device
6 network
7 earth

The invention claimed is:

1. A satellite platform comprising:

one or more first satellites on each of which a first host-side bridge and a first host are mounted, the first host being connected with a network via the first host-side bridge;

one or more second satellites on each of which a first I/O-side bridge and a first I/O device are mounted, the first I/O device being connected with the network via the first I/O-side bridge; and a management device configured to select the first host mounted on at least one of the first satellites and the first I/O device mounted on at least one of the second satellites, according to a configuration request, and form an information processing device in which the first host-side bridge connected with the selected first host and the first I/O-side bridge connected with the selected first I/O device constitute a virtual computer internal bus.

2. The satellite platform according to claim 1, further comprising one or more third satellites on each of which a second host-side bridge, a second host, a second I/O-side bridge, and a second I/O device are mounted, the second host being connected with the network via the second host-side bridge, the second I/O device being connected with the network via the second I/O-side bridge, wherein the management device is configured to select the first host or the second host mounted on at least one of the first satellites and the third satellites, and the first I/O device or the second I/O device mounted on at least one of the second satellites and the third satellites, according to the configuration request, and form an information processing device in which the first host-side bridge or the second host-side bridge connected with the selected first host or the second host and the first 10-side bridge or the second I/O-side bridge connected with the selected first I/O device or the second I/O device constitute a virtual computer internal bus.

3. The satellite platform according to claim 2, wherein the management device uses, as the second satellite, the third satellite that does not have any set of the second host and the second host-side bridge in a normal state due to a failure in the second host or the second host-side bridge mounted on the third satellite.

4. The satellite platform according to claim 2, wherein the management device uses, as the first satellite, the third satellite that does not have any set of the second I/O device and the second I/O-side bridge in a normal state due to a failure in the second I/O device or the second I/O-side bridge mounted on the third satellite.

5. The satellite platform according to claim 1, wherein each of the first host-side bridge and the first I/O-side bridge is a PCI Express bus extension bridge.

6. A method of forming an information processing device, the method being executed by a computer connected with, over a network, one or more first satellites on each of which a first host-side bridge and a first host are mounted and one or more second satellites on each of which a first 10-side bridge and a first I/O device are mounted, the first host being connected with the network via the first host-side bridge, the first I/O device being connected with the network via the first I/O-side bridge, the method comprising:

selecting the first host mounted on at least one of the first satellites and the first I/O device mounted on at least one of the second satellites, according to a configuration request; and forming an information processing device in which the first host-side bridge connected with the selected first host and the first I/O-side bridge connected with the selected first I/O device constitute a virtual computer internal bus.

7. A non-transitory computer readable medium for causing a computer to execute processing to, the computer being connected with, over a network, one or more first satellites on each of which a first host-side bridge and a first host are mounted and one or more second satellites on each of which a first I/O-side bridge and a first I/O device are mounted, the first host being connected with the network via the first host-side bridge, the first I/O device being connected with the network via the first I/O-side bridge, the processing comprising:

selecting the first host mounted on at least one of the first satellites and the first I/O device mounted on at least one of the second satellites, according to a configuration request; and

forming an information processing device in which the first host-side bridge connected with the selected first host and the first I/O-side bridge connected with the selected first I/O device constitute a virtual computer internal bus.

24

* * * * *